United States Patent [19]

Opitz et al.

[11] 4,420,310
[45] Dec. 13, 1983

[54] USE OF OXYALKYLATED NOVOLAKS AS PREPARATION AGENTS FOR DISPERSE DYESTUFFS AND PREPARATIONS MADE WITH SAID AGENTS

[75] Inventors: Konrad Opitz, Liederbach; Max Grobmann, Frankfurt am Main; Hurbert Kruse, Kelkheim; Manfred Schneider, Eppstein; Heinz Uhrig, Steinbach, all of Fed. Rep. of Germany

[73] Assignee: Hoechst Aktiengesellschaft, Frankfurt am Main, Fed. Rep. of Germany

[21] Appl. No.: 111,793

[22] Filed: Jan. 14, 1980

[30] Foreign Application Priority Data

Jan. 16, 1979 [DE] Fed. Rep. of Germany ....... 2901461

[51] Int. Cl.³ .............................. B06P 1/56; B06P 1/16
[52] U.S. Cl. .................................... 8/560; 8/552; 8/608; 8/613
[58] Field of Search ................... 8/495, 552, 560, 608, 8/613

[56] References Cited

U.S. PATENT DOCUMENTS

| | | | |
|---|---|---|---|
| 2,454,541 | 11/1948 | Bock et al. | 525/507 |
| 2,454,545 | 11/1948 | Bock et al. | 525/507 |
| 3,058,919 | 11/1962 | Hagge et al. | 252/336 |
| 3,320,212 | 5/1967 | Shen et al. | 260/49 |
| 3,775,056 | 11/1973 | Grossmann et al. | 8/169 |
| 3,874,891 | 4/1975 | Grobmann et al. | 106/308 S |
| 3,878,136 | 4/1975 | Hofel et al. | 260/14 |
| 3,888,828 | 6/1975 | Grossmann et al. | 260/49 |
| 3,923,457 | 12/1975 | Ong et al. | 8/560 |
| 3,993,439 | 11/1976 | Deubel et al. | 8/560 |
| 4,009,142 | 2/1977 | Deubel et al. | 260/38 |
| 4,060,501 | 11/1977 | Naylor et al. | 525/507 |

FOREIGN PATENT DOCUMENTS

| | | |
|---|---|---|
| 1064075 | 4/1967 | Fed. Rep. of Germany . |
| 2306104 | 7/1980 | Fed. Rep. of Germany . |
| 2520527 | 5/1982 | Fed. Rep. of Germany . |
| 2730223 | 9/1982 | Fed. Rep. of Germany . |
| 1406286 | 6/1977 | France . |
| 2143940 | 2/1980 | France . |
| 2144414 | 2/1980 | France . |
| 2173311 | 3/1980 | France . |
| 2360644 | 3/1981 | France . |
| 1054298 | 1/1967 | United Kingdom . |
| 1513160 | 6/1978 | United Kingdom . |
| 1513311 | 10/1978 | United Kingdom . |
| 1542025 | 3/1979 | United Kingdom . |

Primary Examiner—Maria Parrish Tungol
Attorney, Agent, or Firm—Curtis, Morris & Safford

[57] ABSTRACT

Watersoluble oxalkylated novolaks of the formula

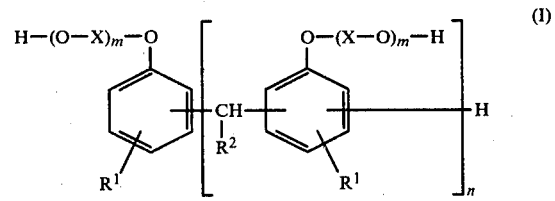

wherein $R^1$ is alkyl of 1 to 18 carbon atoms, $R^2$ is hydrogen or $R^1$, X is ethylene or propylene, m is 6 to 100 and n is 1 to 12, are preparation agents for disperse dyestuffs. Disperse dystuff preparations containing these compounds have a stable and uniform distribution of the dyestuff particles, even with high dyestuff concentrations, and show good dyeing properties, low or no foam in dyebaths and useful viscosities in printing pastes.

13 Claims, No Drawings

USE OF OXYALKYLATED NOVOLAKS AS PREPARATION AGENTS FOR DISPERSE DYESTUFFS AND PREPARATIONS MADE WITH SAID AGENTS

This invention relates to the use, as preparation agents for disperse dyestuffs, of water-soluble products obtained by adding ethylene oxide and/or propylene oxide on polynuclear novolak resins; the products have the formula (I)

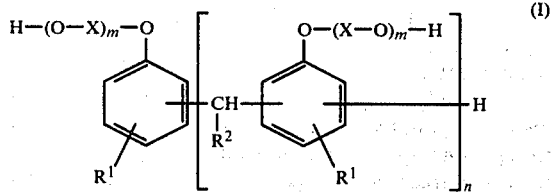

in which $R^1$ is straight chain or branched alkyl of 1 to 18 carbon atoms, $R^2$ is hydrogen or straight chain or branched alkyl of 1 to 18 carbon atoms, X is ethylene or propylene, m is a number of 6 to 100 and n is a number of 1 to 12. It also relates to disperse dyestuff preparations containing such an addition product of the formula (I).

U.S. Pat. No. 2,454,541 describes the use of addition products of ethylene oxide and/or propylene oxide on polynuclear novolak resins as capillary and surface-active substances, for example as demulsifiers and emulsifiers, as detergents for textile structures made of wool or cotton, and as auxiliaries in the treatment of leather, in the dispersion of pigments and for dyeing. The said patent also discloses the preparation of such addition products. According to DIN 55 944 and 55 945 (German Industrial Standards, similar to ASTM D 16-73a) "pigments" are colorants insoluble in the substratum. Hence, for the fine distribution of a pigment in the the substratum, for example a plastics material or a lacquer, the dispersing agent for the pigment has to satisfy very special requirements.

Moreover, it is known from German Pat. No. 2,132,405 to use addition products of formula (I) as starting material for the manufacture of anionic dispersing agents.

The known properties of the addition products of formula (I) do not suggest that they are excellent preparation agents for disperse dyestuff which (since they are "dyestuffs" and thus according to the DIN specifications mentioned above) are soluble in the substratum, usually polyesters, and make other demands on a dispersing agent. Surprisingly, the specified addition products make it possible to produce highly concentrated preparations of disperse dyestuffs having a low content of dispersing agent, which preparations are distinguished by many advantageous properties.

The hitherto known preparations of disperse dyestuffs have a number of disadvantages that the preparations according to the invention do not have. Thus, conventional preparations of disperse dyestuffs containing a high proportion of anionic dispersing agent (in liquid preparations 0.5 part by weight and thereabove, in powder preparations 1 part by weight or more, referred to 1 part by weight of disperse dyestuff) cause an undesired reduction of the viscosity in the preparation of printing pastes with synthetic thickeners. Normally, with an increasing content of dispersing agent in a grinding or kneading paste, the viscosity of the preparation strongly increases so that in an unfavorable case, above all at slightly elevated temperatures, the preparations become highly viscous or even solid. On the other hand, the proportion of the anionic dispersing agent cannot be reduced below a definite value, since otherwise unstable dispersions or dispersions in which the fineness and even distribution is insufficient are obtained.

For the purpose of rationalization shorter and shorter goods-to-liquor ratios in the dyeing bath are desired in dye works. To this end, as highly concentrated dyestuff preparations as possible are preferred. The high proportion of anionic dispersing agent in conventional disperse dyestuff preparations may lead to an undesired foam formation in modern dyeing processes, such as jet dyeing. In many cases high dyestuff retention occurs, above all with pad dyeings, which is also not desired. In printing the high proportion of dispersing agent in the conventional disperse dyestuff preparations has not only the aforesaid unfavorable influence on the viscosity but also requires an expensive washing of the printed material.

The present invention makes it possible to produce disperse dyestuff preparations which do not have the aforesaid drawbacks and which are very suitable for a series of special tasks. Thus, aqueous disperse dyestuff preparations in accordance with the invention can be dried to give powders without their quality being effected. The powders as well as the liquid preparations are excellently suitable for dyeing and printing the widely varying materials.

In the following, preferred embodiments according to the invention are described in detail, the percentages being referred to the weight.

Preferred addition products of the formula (I) are those in which $R^1$ is straight chain or branched alkyl of 6 to 14 carbon atoms, $R^2$ is hydrogen, X is ethylene and/or propylene, m is a number from 10 to 30 and n is a number from 2 to 9.

Preferred preparations contain from 5 to 90%, more preferably 30 to 80%, of disperse dyestuff, from 2 to 40%, more preferably 2 to 20%, of one or several addition products of formula (I), up to 30% of anionic dispersing agents and up to 70% of water and/or the usual adjuvants. Thus, the preparations according to the invention may additionally contain as such usual adjuvants non-ionic dispersing agents other than those included as oxalkylates in accordance with the invention and additives normally used with such preparations, for example known hygroscopic agents for water retention, foam inhibitors, dedusting agents or preservatives.

Especially preferred preparations contain from 30 to 80% of disperse dyestuffs, from 3 to 12% of addition product (I), up to 4% of anionic dispersing agent and from 4 to 67% of water and/or adjuvants, more particularly up to 20% of a water-retaining agent, for example glycol, and about 25 to 65% of water.

Preferred powder preparations contain about 65 to about 80% of disperse dyestuff, about 5 to about 18% of addition product (I) and about 7 to about 30% of anionic dispersing agent.

Especially good results are obtained with highly concentrated liquid and powder preparations having as low as possible a content of dispersing agent. Preferred liquid preparations have a total content of addition product (I) and anionic dispersing agent of about 3 to about 13%, preferably about 10%, while in preferred powder preparations the total content of these substances is in the range of from about 20 to about 35%, preferably about 20 to about 30%. Thus, in addition to the dyestuff and the dispersing agent, the preparations do not contain an essential proportion of foreign substances, for example inorganic salts. If the preparations contain the aforesaid adjuvants or other usual additives, they may be added during or after the fine distribution of the disperse dyestuff.

In the addition products (I) the ethylene and propylene oxide units X can be randomly distributed over the alkylene oxide chains or they are arranged in "blocks" depending on whether they have been produced with a mixture of ethylene and propylene oxide or the oxides have been added individually and sucessively.

If the preparations according to the invention contain anionic dispersing agents, those normally used are suitable; these are preferably condensation products of aromatic sulfonic acids and formaldehyde, more preferably condensation products of alkylnaphthalene sulfonic acids, preferably methylnaphthalene sulfonic acids, and formaldehyde as known from German Patent No. 2,442,514. Condensation products of optionally substituted phenol with formaldehyde and sodium sulfite and alkali metal salts of lignosulfonic acids can also be used.

In comparison with conventional disperse dyestuff preparations, the preparations according to the invention are distinguished by a very low content of surface active substances. In addition, the water-soluble addition products (I) to be used according to the invention are easily biologically degradable so that the waste water is polluted to a minor degree only.

In spite of the small amount of surface active compounds used the preparations according to the invention have a high content of coloring matter and good flowing properties, and are stable in storage.

Because of their good compatibility with synthetic thickeners, the preparations can be used in printing inks for roller printing with very "shallow" engravings, and they give prints of high color intensity. They can also be used in rotary screen printing.

The preparations according to the invention can be produced by any known process. A disperse dyestuff or a mixture of disperse dyestuffs can be mixed, for example, with one or several addition products (I), optionally an anionic dispersing agent, and with other adjuvants, if desired, whereupon the mixture is mechanically comminuted. It is possible to vary to order in which the individual components are added. For mechanical comminution kneaders, ball mills, dispersing equipment, bead mills, sand mills or disk attrition mills are used. To determine whether the desired fineness, generally a particle size of approximately 3 μm, preferably about 1 μm, has been reached a filter test or an examination under the microscope is used. The preparations obtained in this manner contain the coloring matter in a stable and finely divided form.

The fineness and even distribution is preserved even after storage for several weeks at room temperature and at 50° C. and it is not affected either under the action of cold.

For the production of a powder preparation an aqueous preparation can be dried in usual manner, for example by spray drying. A powder preparation obtained in this manner can be readily redispersed by simply adding it while stirring to water or a binder solution.

Owing to the low content of surface-active substances no retarding effect is observed when the disperse dyestuff preparations of the invention are used in dyeing baths or printing pastes, and brilliant shades are obtained. Moreover, in the case of direct printing the following washing can be substantially shortened or, with the use of thickenings having a low solids content, it can even be dispensed with completely without the feel of the printed material and the brightness of shade being noticeably affected. In this case the preparations are preferably adjusted to a pH in the range of about 6 to 8.

According to an especially preferred embodiment of the invention disperse dyestuffs are used, at least 60% of which sublime without decomposition at atmospheric pressure and a temperature of 150° to 220° C., especially disperse dyestuffs of the series of monoazo, disazo, anthraquinone, quinophthalone, nitro, azomethine, naphthalene tetracarboxylic acid and benzoxanthene dyestuffs or mixtures thereof. The preparations obtained are suitable for the manufacture of printing inks for printing transfer papers for thermoprinting.

The following examples illustrate the invention; the percentages and parts are by weight unless otherwise stated.

EXAMPLE 1

350 parts of dyestuff of the formula (1)

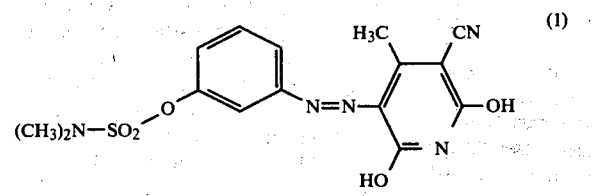

in a solution of 87 parts of a novolak consisting on the average of 7 nonylphenol radicals linked via —CH$_2$— bridges and reacted with 105 mols of ethylene oxide (in the following defined as addition product A), in 300 parts of water and 150 parts of ethylene glycol are ground in a bead mill with glass beads (1 mm in diameter) for 3 hours while cooling. The dispersion then obtained has good flowing properties and more than 90% of the particles have a size below 3 μm. The dispersion is made up to 1,000 parts with water and the beads are separated by filtration. The preparation obtained has good flowing properties, it is stable in storage at room temperature and at 50° C. and insensitive to low temperatures.

EXAMPLE 2

400 parts of dyestuff of formula (1) in a solution of 100 parts of a novolak consisting on the average of 3 nonylphenol radicals linked via —CH$_2$—bridges and reacted with 45 mols of ethylene oxide (in the following defined as addition product B), in 300 parts of water and 150 parts of ethylene glycol are ground for 3 hours while cooling in a bead mill with glass beads (1 mm in diameter). The dispersion obtained has good flowing properties and more than 90% of the particles have a size below 3 μm. The dispersion is made up to 1,000 parts with water and separated from the beads by filtration. The preparation has good flowing properties and is stable in storage for a prolonged period of time at room temperature and at 50° C. It is insensitive to low temperatures.

EXAMPLE 3

400 parts of dry dyestuff of the formula (2)

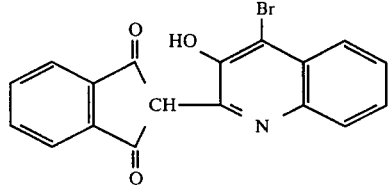
(2)

in a solution of 40 parts of addition product A, 20 parts of a condensation product of methylnaphthalene sulfonic acid and formaldehyde as described in Example D of German Patent No. 2,442,514 (defined in the following as anionic dispersing agent MNF), 150 parts of ethylene glycol, 300 parts of water and 2 parts of chloroacetamide as preservative are ground while cooling in a bead mill with glass beads (1 mm in diameter). After 4 hours a dispersion is obtained in which more than 90% of the particles have a size below 3 μm. The ground material is made up to 1,000 parts with water and separated from the beads by filtration. The preparation obtained has good flowing properties, it is stable in storage for several weeks at room temperature and at 50° C. and it is insensitive to low temperatures.

Aqueous, freely flowing and stable preparations can also be obtained by using, instead of the components specified in Example 3, the dyestuffs, dispersing agents and other components listed in the following Table 1 and by proceeding in the manner described in Example 3.

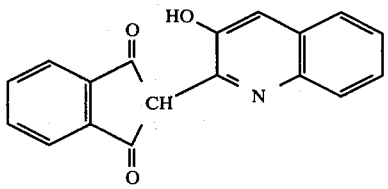
(3)

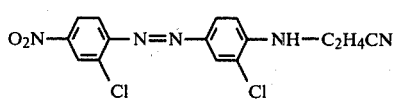
(4)

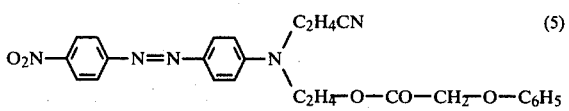
(5)

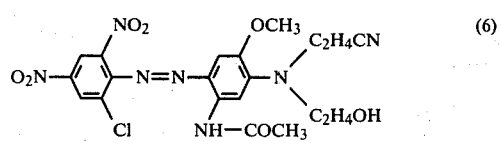
(6)

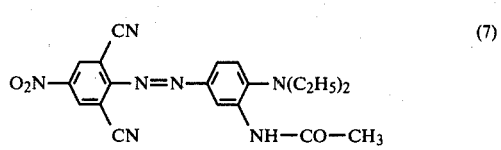
(7)

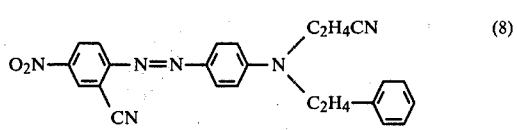
(8)

TABLE 1

(indications referred to 1,000 parts of preparation, the balance being water)

| Example | dyestuff parts | no. | addition product parts | type | dispersing agent parts | type | ethylene glycol parts | preservative parts | type | time of grinding (hrs) |
|---|---|---|---|---|---|---|---|---|---|---|
| 4  | 400 | 2 | 40  | C | 20   | MNF | 200 | 4 | CA | 3 |
| 5  | 400 | 2 | 40  | D | 20   | "   | 200 | 4 | CA | 3 |
| 6  | 400 | 2 | 40  | E | 20   | "   | 200 | 4 | CA | 4 |
| 7  | 400 | 2 | 40  | F | 20   | "   | 150 | 4 | CA | 4 |
| 8  | 400 | 2 | 40  | A | 20   | KF  | 150 | 3 | P  | 3 |
| 9  | 500 | 3 | 60  | A | 40   | MNF | 150 | 2 | CA | 5 |
| 10 | 500 | 3 | 40  | C | 20   | "   | 150 | 2 | CA | 5 |
| 11 | 500 | 3 | 60  | A | 30   | KF  | 150 | 4 | P  | 5 |
| 12 | 400 | 4 | 60  | C | 40   | MNF | 200 | 4 | P  | 3 |
| 13 | 350 | 5 | 90  | A | 10   | "   | 150 | 4 | P  | 5 |
| 14 | 350 | 5 | 120 | C | 10   | LS  | 150 | 3 | P  | 5 |
| 15 | 350 | 5 | 50  | G | 10   | MNF | 150 | 4 | P  | 4 |
| 16 | 350 | 5 | 120 | A | 10   | KF  | 150 | 3 | P  | 4 |
| 17 | 350 | 6 | 105 | A | 17.5 | MNF | 150 | 4 | P  | 5 |
| 18 | 300 | 6 | 70  | H | 17.5 | "   | 150 | 4 | P  | 6 |
| 19 | 400 | 7 | 30  | A | 6.6  | LS  | 200 | 4 | P  | 3 |
| 20 | 400 | 7 | 30  | C | 6.6  | "   | 200 | 4 | P  | 3 |
| 21 | 400 | 7 | 30  | H | 6.6  | "   | 200 | 4 | P  | 3 |
| 22 | 400 | 7 | 30  | J | 6.6  | "   | 200 | 4 | P  | 3 |
| 23 | 300 | 8 | 60  | A | 20   | MNF | 200 | 8 | P  | 6 |
| 24 | 300 | 8 | 60  | J | 20   | MNF | 200 | 8 | P  | 6 |
| 25 | 300 | 9 | 45  | A | 12   | "   | 150 | 5 | P  | 6 |
| 26 | 300 | 9 | 90  | A | 15   | "   | 150 | 5 | P  | 5 |
| 27 | 300 | 9 | 45  | H | 12   | "   | —   | 5 | P  | 5 |
| 28 | 300 | 9 | 60  | K | 15   | "   | —   | 5 | P  | 5 |
| 29 | 350 | 9 | 70  | L | 15   | "   | 150 | 4 | P  | 4 |

Definitions with respect to Tables 1 and 2
(a) Dyestuffs 3 to 9 have the following formulae

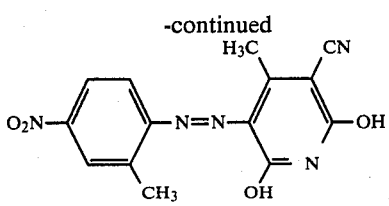

(b) Addition products C to L have the following composition:

C is a novolak consisting on the average of 9 nonylphenol radicals linked via —CH$_2$—bridges are reacted with 224 mols of ethylene oxide.

The other products have corresponding compositions as follows:

D: 211 mols of ethylene oxide, 7 nonylphenol radicals;
E: 140 mols of ethylene oxide, 7 dodecylphenol radicals;
F: 108 mols of ethylene oxide, 9 hexylphenol radicals;
G: block polymer from 18 mols of ethylene oxide + 18 mols of propylene oxide + 18 mols of ethylene oxide, 9 nonylphenol radicals;
H: block polymer from 80 mols of ethylene oxide + 25 mols of propylene oxide, 7 nonylphenol radicals;
I: 91 mols of ethylene oxide, 7 nonylphenyol radicals;
K: 90 mols of ethylene oxide, 3 nonylphenol radicals;
L: a novolak, consisting on the average of 3 o-cresol radicals linked via isooctylmethylene bridges and reacted with 37.5 mols of ethylene oxide.

(c) Referring to the anionic dispersants:

KF means a condensation product from cresol, formaldehyde and sodium (German Patent No. 2,032,926);
LS means lignin-sulfonate.

(d) Preservatives;

CA: chloroacetamide;
P: sodium pentachlorophenol.

EXAMPLE 30

400 parts of dry dyestuff of formula (1) in a solution of 30 parts of dispersant MNF, 30 parts of addition product A and approximately 300 parts of water are ground in a bead mill with glass beads (1 mm in diameter). After 3 hours, a freely flowing dispersion is obtained in which the predominant portion of the particles has a size below 3 μm. 135 parts of dispersant MNF and water, if necessary, are added and the aqueous paste obtained is dried by spray drying at an inlet temperature of 160° to 180° C. and an outlet temperature of 70° to 80° C. A scarcely dusting powder is obtained having a dyestuff content of 67%. The powder can be readily dispersed when it is added while stirring to a master thickening or an aqueous dye bath.

EXAMPLE 31

882 parts of a moist press cake of the dyestuff of formula (3) having a solids content of 34%, 60 parts of addition product A and 40 parts of dispersant MNF are ground in a bead mill with glass beads (2 mm in diameter). After 4 hours the dyestuff is finely divided and the predominant portion of the particles is made up of those having a size below 3 μm. The aqueous paste is dried in a spray drier at an inlet temperature of 160° to 180° C. and an outlet temperature of 70° to 80° C. A scarcely dusting, freely flowing powder is obtained having a dyestuff content of 75%. It can be readily dispersed by adding while stirring to a master thickening or an aqueous dye bath.

Powder preparations having the indicated dyestuff contents and the same good properties are obtained by using, instead of the components specified in Example 31, the dyestuffs, addition products and anionic dispersants listed in the following table 2 and proceeding in analogous manner.

TABLE 2

| Ex. | Dyestuff pts. | Dyestuff no. | addition product pts. | addition product type | dispersant parts | dispersant type | grinding time (hrs) | dyestuff content |
|---|---|---|---|---|---|---|---|---|
| 32 | 400 | 1 | 75 | A | 75 | KF | 4 | 73% |
| 33 | 300 | 7 | 56 | A | 45 | MNF | 3 | 75% |
| 34 | 320 | 7 | 60 | H | 48 | MNF | 4 | 75% |
| 35 | 320 | 7 | 70 | A | 30 | KF | 4 | 76% |
| 36 | 320 | 7 | 70 | A | 30 | LS | 4 | 76% |

EXAMPLE 37

150 parts of a preparation prepared as described in Example 3, 4 or 9 are directly added while stirring to 850 parts of an aqueous synthetic polyacrylate master thickening. The thickening has a viscosity of 1.5 to 2 Pas (measured with the Haake Viscosimeter VT 02) which changes very slightly only during the addition of the preparation due to its low content of dispersant.

When printing the printing paste by rotary screen printing on paper or another commonly used intermediate carrier and after sublimation under conditions usual for heat transfer printing, uniform, sharp and level prints on polyester materials are obtained.

If a conventional dyestuff preparation having a higher proportion of anionic dispersant is used instead of a preparation according to the invention, the viscosity of the printing paste is reduced to such a degree that it becomes useless.

EXAMPLE 38

While stirring with a rapid stirrer, 150 parts each of the preparations prepared as described in Example 1, 13 or 26 are directly added to 850 parts of an aqueous synthetic polyacrylate master thickening. The previously adjusted viscosity of about 1.5 pas (Haake viscosimeter), changes very little only during the addition of the preparations. The printing inks are suitable for direct printing of polyester materials. Owing to the low content of dispersant the otherwise necessary washing can be dispensed with. Intense and fast prints of good levelness are obtained.

EXAMPLE 39

With changing circulation of the bath, a cross-wound package of 300 g of a polyester/wool yarn is dyed for 1 hour at 106° C. at a pH of 5 using the normal dyeing adjuvants in a bath containing per liter 3.4 of the preparation of Example 1 or 13. After rinsing the cross wound package, level and intense dyeings having a good fastness to rubbing are obtained.

EXAMPLE 40

Level and intense colorations of a good build-up are obtained on polyester fabrics and mixed polyester fabrics using dye baths containing the preparation described in Example 1 or 13 in high temperature dyeing with goods-to-liquor ratios generally used in practice (1:10 to 1:30) and at conventional temperatures (125° to 135° C.).

We claim:

1. A disperse dyestuff preparation containing an effective amount of a water-soluble oxalkylate of the formula

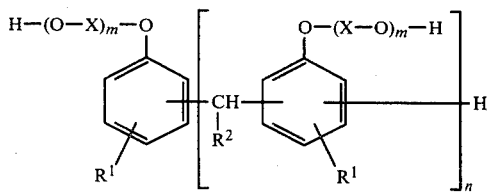

wherein $R^1$ is straight-chain or branched alkyl of from 1 to 18 carbon atoms, $R^2$ is hydrogen or straight-chain or branched alkyl of from 1 to 18 carbon atoms, X is ethylene, propylene or both ethylene and propylene, m is a number of from 6 to 100 and n is a number of from 1 to 12.

2. A preparation as claimed in claim 1, wherein $R^1$ contains 6 to 14 carbon atoms, $R^2$ is hydrogen, m is a number of 10 to 30 and n is a number of 2 to 9.

3. A preparation as claimed in claim 1, containing
5 to 90 weight percent of dyestuff,
2 to 40 weight percent of oxalkylate,
0 to 30 weight percent of one or more anionic dispersants, and
0 to 70 weight percent of water, one or more usual adjuvants, or a combination of water and one or more usual adjuvants.

4. A preparation as claimed in claim 3, containing 2 to 20 weight percent of oxalkylate.

5. A preparation as claimed in claim 1, containing
30 to 80 weight percent of dyestuff,
3 to 12 weight percent of oxalkylate,
0 to 4 weight percent of anionic dispersant, and
4 to 67 weight percent of water, one or more usual adjuvants, or a combination of water and one or more usual adjuvants.

6. A preparation as claimed in claim 5, containing
0 to 20 weight percent of an agent retarding the drying up of the preparation and
25 to 65 weight percent of water.

7. A preparation as claimed in claim 1, containing
65 to 80 weight percent of dyestuff,
5 to 18 weight percent of oxalkylate, and
7 to 30 weight percent of anionic dispersant.

8. A preparation as claimed in claim 3, which is liquid and wherein the content of oxalkylate and anionic dispersant together is 3 to 13 weight percent.

9. A preparation as claimed in claim 3, which is solid and wherein the content of oxalkylate and anionic dispersant together is 20 to 35 weight percent.

10. A preparation as claimed in claim 9, wherein the content of oxalkylate and anionic dispersant is 20 to 30 weight percent.

11. A disperse dye preparation comprising a disperse dye and a dispersing agent which is a product prepared by condensing a monoalkyl substituted phenol wherein the alkyl has 1 to 18 carbon atoms with formaldehyde and then reacting the resulting condensation product with 6-100 mols of ethylene oxide per mol of phenol.

12. A disperse dye preparation comprising a disperse dye and a dispersing agent which is a water-soluble oxalkylate of the formula

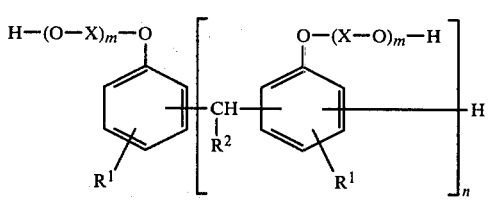

wherein $R^1$ is straight-chain or branched alkyl of from 1 to 18 carbon atoms, $R^2$ is hydrogen, X is ethylene, n is a number of from 1 to 12 and m is a number of from 6 to 100.

13. A disperse dye preparation comprising a disperse dye and a dispersing agent wherein the dispersing agent is a water-soluble oxalkylate of the formula

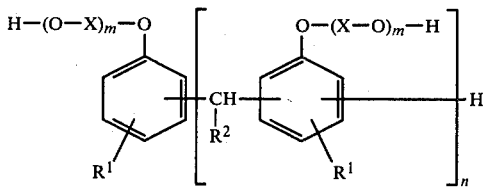

wherein $R^1$ is straight-chain or branched alkyl of from 1 to 18 carbon atoms, $R^2$ is hydrogen, X is ethylene, propylene or both ethylene and propylene, n is a number of from 1 to 12 and m is a number of from 6 to 100.

* * * * *